Sept. 14, 1954   H. D. BONACCI   2,689,140
AIR BRAKE HOSE COUPLING WITH TORSIONAL
SCUFFING FREE GASKET
Filed May 29, 1952
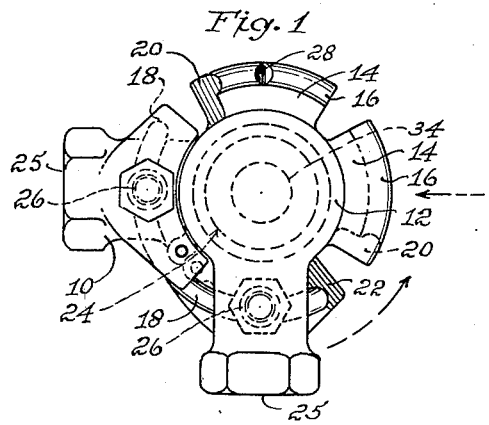
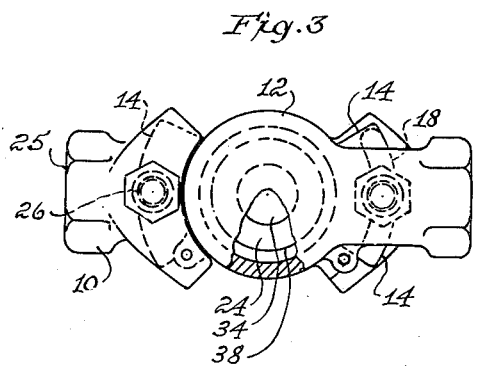
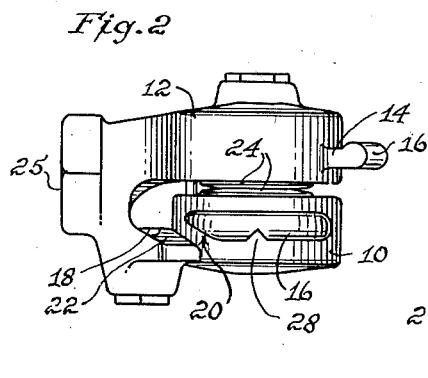
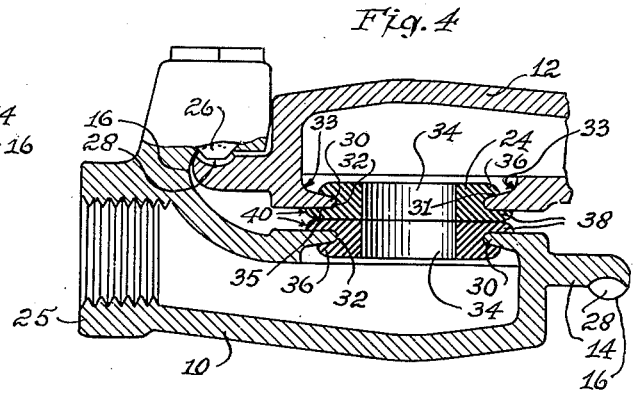
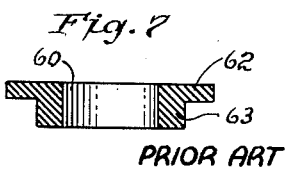
PRIOR ART
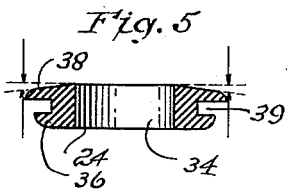
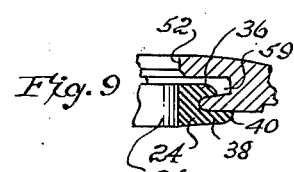
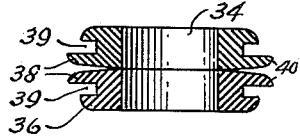
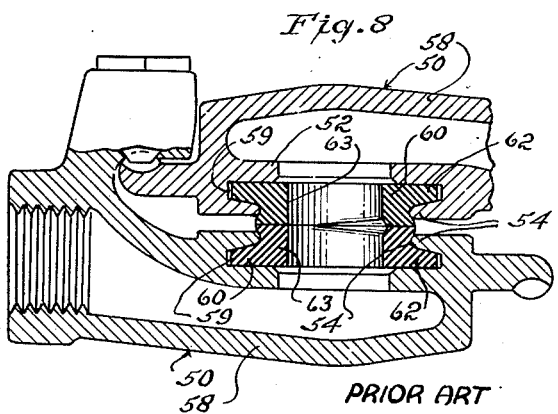
PRIOR ART
Harry D. Bonacci
INVENTOR.
BY
ATTORNEY Patented Sept. 14, 1954

2,689,140

UNITED STATES PATENT OFFICE 2,689,140

AIR BRAKE HOSE COUPLING WITH TORSIONAL SCUFFING FREE GASKET

Harry D. Bonacci, Trenton, N. J.

Application May 29, 1952, Serial No. 290,796

1 Claim. (Cl. 285—62)

This invention relates to hose couplings and gaskets therefor and more particularly to couplings and gaskets used as a hose connection in air brake systems of large motor trucks.

Couplings for the purpose mentioned are generally made in two identical parts with two opposed resilient gaskets which are brought into sealing relation by means of cooperative wedge-like elements actuated by relative rotary movement of the coupling members. Since the two gaskets are in face to face contact during the rotary movement mentioned an enormous torsional strain is exerted on the gaskets before they reach sealing position.

Due partly to the construction of the coupling members and partly to the formation of the gaskets used to effect the seal, previous designs of air brake couplings and gaskets widely used in the air brake systems of large trucks have been found seriously deficient in that the gaskets are difficult to install in the coupling, and as a consequence are frequently scuffed or otherwise damaged so badly that they fail to provide an adequate seal to hold the air pressure necessary for operation of the air brakes; and even more dangerous is the danger of a damaged or distorted gasket failing somewhere at a hill on the highway after having passed the initial test.

Therefore, one of the principal objects of the present invention is to provide a hose coupling and a resilient gasket therefor in which the gasket will be easy to install in the coupling.

Another object of this invention is to provide a hose coupling and a resilient gasket therefor in which scuffing or other damage to the gasket during the installation in the coupling is positively precluded, thus insuring the coupling against failure in an emergency and also insuring longer lasting gaskets.

A further object of the present invention is to provide a coupling and gasket of the character referred to in which less effort to close the coupling, or to rotate the gaskets into sealing relation, is required than in previous designs.

A still further object of this invention is to provide an air hose coupling in which the castings of the coupling members are simple, easy and inexpensive to manufacture.

Another object of the present invention is to provide a gasket of the character mentioned which is adaptable not only to my improved coupling, but can also be used to advantage in previous types of two part couplings.

Other objects and advantages of my invention will be apparent from the following specification and reference to the accompanying drawings, in which:

Fig. 1 is a plan view of a hose coupling in accordance with one embodiment of my invention, the coupling members being in open relation;

Fig. 2 is a view in elevation looking in the direction indicated by the straight arrow in Fig. 1;

Fig. 3 is a plan view of the coupling with the coupling members in closed relation;

Fig. 4 is a longitudinal view, partly in section, of the coupling and gaskets shown in Fig. 1, 2, and 3.

Fig. 5 is a sectional view of one of my improved gaskets;

Fig. 6 is a sectional view similar to Fig. 5, but showing two of the gaskets in face to face contact, and not under compression;

Fig. 7 is a sectional view similar to Fig. 5, but showing a previous design of gasket, for comparison;

Fig. 8 is a view similar to Fig. 4, but showing a previous design of coupling with gaskets of the type shown in Fig. 7; and Fig. 9 is a fragmentary section showing one of my improved gaskets installed in one of the coupling members shown in Fig. 8.

Referring to the drawings in which like numerals designate like parts in the several views, a hose coupling of the type in which my improved construction is embodied comprises two hollow cylindrical members or casings 10 and 12, each having an arcuate radially extending flange 14 terminating at its outer edge in a concentrically disposed ridge 16. The diametrically opposite side of each coupling is provided with another arcuate radially extending flange having therein a concentrically disposed groove 18 adapted to receive the ridge 16 of the opposed coupling member. The front portion of each of the ridges 16 terminates in a wedge-like backwardly inclined portion 20, and the rear end of each of the grooves 18 merges into a forwardly inclined portion 22 by means of which the ridges 14, operating in diametrically opposed relation, are guided or lifted into their respective corresponding grooves when the member 12, for example, is rotated in the direction indicated by the curved arrow in Fig. 1. With the resilient gaskets 24 installed in the coupling members 10 and 12, these members are placed in angularly disposed, axially opposed relation, as shown in Figs. 1 and 2. The member 12 is then rotated, as indicated by the curved arrow in Fig. 1, until the threaded connections 25 of the two members are in alignment as shown in Fig. 3. During this movement the two coupling members 10 and 12 are forced toward each other by cooperative action of the inclined surfaces 20 and 22, the concentric ridges 16 and grooves 18, thereby clamping the opposed gaskets tightly against each other, as shown in Fig. 4. Spring urged pins 26 in the members 10 and 12 engage notches 28 in the ridges 16 of the respective opposite members to secure the two members in aligned, or closed relation.

As shown in Fig. 4, each of the coupling members 10 and 12 of my improved coupling has a single inwardly projecting lip 30, the inner surface 31 of which is preferably tapered toward its terminal edge, surrounding the central opening 32. The outer circumferential edge of the inner surface referred to merges into an annular wall 33 (Fig. 4) which is substantially perpendicular to the axis of the opening 32, thereby forming an unobstructed recess of substantially greater diameter than that of the opening 32 for the reception of the anchoring flange 36 of gasket 24. The opposite or outer surface 35 of the lip 30 is flat and substantially perpendicular to the axis of the opening 32.

My improved gasket 24 has a central opening 34 and also two integral annular flanges 36 and 38, with an intermediate annular groove 39 of rectilinear formation and adapted to fit over either of the lips 30. The flanges 38 are of the greater diameter and relatively thin, and the gaskets are installed with the flanges 38 in face to face relation. The face surface of each of the flanges 38 is slightly conical, being tapered from the edge of the central opening 34 to its outer edge which is preferably rounded, as indicated at 40, to facilitate its slidable movement on the opposed flange. The flanges 36 are of the smaller diameter and substantially thicker than the flanges 38 to facilitate their insertion through the ports 34, while also affording sufficient stiffness to prevent their being forcibly withdrawn through the openings 32 while being brought into sealing position.

The slight taper of the gaskets 24 may be varied within relatively narrow limits, but should be such as to impose the least possible frictional resistance between the faces of opposed gaskets while being brought into sealing relation, and yet afford continuous line contact of the faces when the gaskets are in sealing position. A taper of the order of .02 inch from the edge of the outer edge of the flange 38 toward the edge of the central opening 34, indicated by the arrows in Fig. 5, has been found to be adequate, in a standard air hose coupling for a motor truck air brake system. However, a sealing flange 38 having a maximum taper of approximately 20 degrees or a minimum taper of approximately 3 degrees will function efficiently as hereinafter described. Such a taper permits the two gaskets to proceed far toward sealing position before effective frictional resistance and torsional strain is exerted on the gaskets, which will then be near closed, or sealing relation, and the final relative rotation of the gaskets can be effected without difficulty. As shown in Fig. 4, the natural resiliency of the material in the gaskets causes its distribution and sealing action across the opposed faces of the flanges 38.

As shown for comparison in Figs. 7 and 8, a widely used previous design of hose coupling 50 is provided with a pair of spaced lips 52 and 54 surrounding the central opening 56 of each coupling member 58, and forming an annular groove 59 therebetween. Also a gasket 60, having a single relatively thick flange 62 and a central cylindrical projection 63 is adapted for insertion in the coupling members.

It will be seen that in the installation of a flange 62 of one of the gaskets 60 between the lips 52 and 54, great effort must be exerted in order to produce sufficient distortion to force the flange 62 between the lips 52 and 54. It will be seen further that when a pair of gaskets in the coupling members is brought into sealing relation, the ends of the cylindrical projections 63 must be in abutting relation and in uniformly cylindrical condition in order to insure a fluid-tight seal under pressure. Such abutting relation is frequently impossible because of distortions of the gaskets occurring during the frictional contact of the gaskets when in movement toward sealing position. Even when seated in substantially abutting relation such gaskets are held in a state of torsional strain and distortion which causes an uneven and uncertain seal. Moreover, the form of the gaskets causes scuffing and other damage to the sealing surface when the two gaskets are in slidable contact under compression.

With my improved construction the torsional strain on the gaskets 24 during the procedure of installation is slight, and damage to the sealing surfaces is entirely prevented.

In Fig. 9 is shown one of my improved gaskets 24 installed in a double lip coupling such as that shown in Fig. 8. It will be seen that it fits over the lower lip 54 in the same manner as over the lip 30. The other lip 52 is then superfluous, constituting only an obstruction in the air chamber. However, one of the important advantages of my improved gasket is that it is adaptable not only to couplings of my new design, but also as gasket replacements in the thousands of conventional hose couplings already in use.

It is apparent from the foregoing description that, in a broad sense, the novelty of my improved coupling resides in the provision of a single annular lip for engagement with the gasket, in the place of the double lip arrangement of the conventional design illustrated in Fig. 8. It is also apparent that the novelty of my improved gasket resides, broadly, in the provision of a pair of spaced flanges for engagement with a single lip in a coupling member. These improvements, although simple, constitute far more than a reversal of the elements of an old structure. For example, it is obvious that the provision of a single lip permits a smaller casting having adequate fluid chambers in the two coupling members than is permitted by the double lip design, besides providing a simpler and more economical casting, as well as providing efficient means for the installation in the coupling of a double flanged gasket. It is also obvious that the provision of the pair of spaced flanges of my improved gasket provides convenient means for installing the gasket either in my improved coupling or in the double lip design in a secure manner, in addition to the advantages of the tapered sealing flanges 38 already mentioned.

Although my improved coupling and gasket have been described as applying particularly to air hose in brake systems for motor trucks, it should be understood that they can be applied to fluid lines of any character where the features described are beneficial. It should also be understood that changes in the details of construction may be made within the spirit and scope of my invention, and that I am not limited to the specific embodiments of my invention illustrated and described.

I claim:

A hose coupling of the class described including in combination, a pair of hollow rotatable members having opposed, concentrically arranged ports, each of said members having diametrically disposed arcuate flanges provided with coacting wedge elements for forcing said members and ports towards each other upon rotation in one direction, each of said members having an inwardly projecting supporting lip provided with a flat outer surface surrounding one of said ports, and a pair of resilient similar shaped gaskets having pairs of axially spaced integral inner anchoring flanges and outer sealing flanges seated on and overlapping said lips and having opposed central openings extending therethrough, the outer flanges of said gaskets being relatively thin and having slightly frusto-conical abutting outer faces, the taper of each face being limited to a degree so as initially to be freely rotated one upon the other so as to impose the least possible frictional resistance to restriction of rotative movement of the outer thin edges of the sealing flanges until the wedge elements are moved in engagement, whereupon the opposed thin sealing flanges of said gaskets upon further rotation are compressed into sealing contact with each other between said lip across substantially their entire surfaces by the action of the wedging elements.

References Cited in the file of this patent

UNITED STATES PATENTS

| Number | Name | Date |
| --- | --- | --- |
| 193,078 | Eames | July 17, 1877 |
| 833,702 | Tomlinson | Oct. 16, 1906 |
| 844,975 | Thornton | Feb. 19, 1907 |
| 1,245,786 | Robinson | Nov. 6, 1917 |
| 1,245,786 | Robinson | Nov. 6, 1917 |
| 1,860,038 | Lange | May 24, 1932 |
| 2,250,199 | Kelly | July 22, 1941 |
| 2,459,752 | Wilson et al. | Aug. 13, 1945 |